Nov. 6, 1945.　　J. R. ALFONTE　　2,388,458
FORK-LIFT TRUCK
Filed Sept. 9, 1944　　3 Sheets-Sheet 1

INVENTOR.
James R. Alfonte
BY
William F. Desmond
ATTORNEY

Nov. 6, 1945.     J. R. ALFONTE     2,388,458
FORK-LIFT TRUCK
Filed Sept. 9, 1944     3 Sheets-Sheet 2

INVENTOR.
James R. Alfonte
BY
William F. Diamond
ATTORNEY

Nov. 6, 1945.   J. R. ALFONTE   2,388,458
FORK-LIFT TRUCK
Filed Sept. 9, 1944   3 Sheets-Sheet 3

INVENTOR.
James R. Alfonte
BY
William F. Desmond
ATTORNEY

Patented Nov. 6, 1945

2,388,458

UNITED STATES PATENT OFFICE 2,388,458

FORK-LIFT TRUCK

James R. Alfonte, United States Army, Fortville, Ind.

Application September 9, 1944, Serial No. 553,418

3 Claims. (Cl. 214—84)

(Granted under the act of March 3, 1883, as amended April 30, 1928; 370 O. G. 757)

The invention described herein, if patented may be manufactured and used by or for the Government for governmental purposes, without the payment to me of any royalty thereon.

This invention relates to fork-lift trucks now in general use in and around warehouses. Such trucks have proved to be highly efficient in the handling of goods stacked on skids or pallets, in that one to three or more tons of material may be lifted as a unit and transported to a desired point and there placed on the floor, or upon a similar unit previously transported to the particular point and placed upon the floor.

While this type of lift truck has many advantages, it is essential in most of them that the skid or pallet be discharged with the goods inasmuch as no means is provided for mechanically removing the goods from the pallets. In the loading of freight cars, ships, etc., it is desirable, for various reasons, that the pallets be retained at the warehouse; thus it becomes necessary that four or five men be employed to manually remove the goods from the pallets and stack them in the storage space of the vehicle.

More recently, attempts have been made to overcome this shortcoming of fork-lift trucks by mechanically holding the pallet or skid on the forks of the truck while a mechanical pusher forces the goods, as a unit, off of the pallet onto the floor or onto the top of another unit previously placed in position. These more recent lift trucks however are not entirely satisfactory, not only because it is essential that special pallets, having an uninterrupted load-bearing surface, be employed so as to provide a smooth surface for the goods being pushed therefrom, but also because the pallets must be provided with one or more special elements for cooperation with the additional mechanism on the truck, which serves to hold the pallet while the goods are being pushed therefrom. Furthermore, since the goods bear directly on the pallet surface as they are being pushed off, it is apparent that their removal is often rendered difficult, if not impossible, by reason of nail heads, splinters, etc., projecting from the surface of the pallet. And again, the goods are frequently damaged, particularly when sacks of flour and similarly packaged goods are being handled.

It is an object of the present invention, therefore, to provide an improved fork-lift truck in which the forks will automatically engage and hold pallets, of conventional types, while the goods are being pushed therefrom in the course of loading freight cars and similar vehicles.

A further object of the invention resides in the provision of anti-friction means associated with the fork-lift and adapted to cooperate with conventional pallets so that the goods may be automatically spaced above the bearing surface of the pallet while being removed by a power-operated pusher.

Other objects and advantages of the invention will be apparent from the following description when taken in connection with the accompanying drawings, in which, Figure 1 is a perspective view of the improved fork-lift truck.

Figure 1:
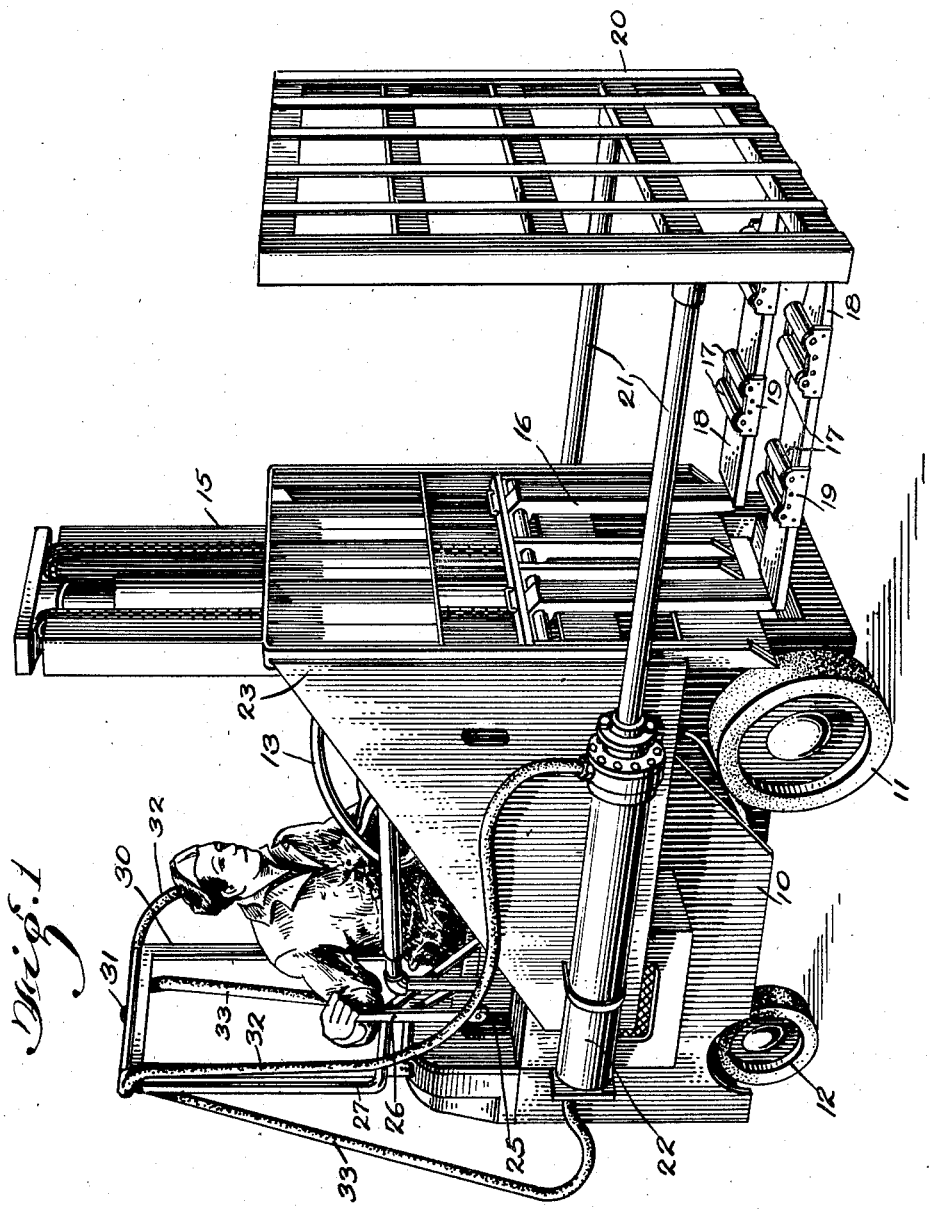

Referring to the drawings in more detail and especially to Figure 1, the numeral 10 indicates one of the well-known types of lift trucks provided with a pair of front wheels 11 and a pair of rear wheels 12, the latter being mounted on stub axles (not shown) and operated for steering purposes by means of a wheel 13 adjacent the operator's seat 14. Trucks of this type are usually provided with a vertically-extending frame or mast 15 upon which a load-supporting carriage 16 is slidably mounted.

These industrial trucks are almost universally used in conjunction with pallets or skids for transporting and storing goods in warehouses, freight depots, etc., and they are generally provided with a pair of plain-surfaced fork members adapted to enter the space between the upper and lower surfaces of the pallets. As previously mentioned, these earlier devices are entirely satisfactory in the handling of palletized goods in and around warehouses, but are ineffective in the loading of goods into freight cars and other vehicles, due to the fact that the various articles on a pallet must be individually removed by manual labor and stacked in the vehicle.

This serious defect in conventional fork-lift trucks has been overcome by the present invention in the following manner. The forks of the carriage are provided with a combined interlocking and anti-friction means for use with conventional pallets, whereby the pallets are automatically held on the forks and the goods automatically raised above the load-bearing surface of the pallet and supported on anti-friction rollers, so that a reciprocable pusher which is mounted on the truck may easily push the goods over the rollers onto the floor of the car or onto the top of a previously deposited stack, without damage to the goods.

The anti-friction and interlocking means employed in the present embodiment of the invention consists of pairs of anti-friction rollers 17 which may be detachably mounted on the upper surfaces of the forks 18. The shafts of these rollers are mounted in bearing plates 19 which may be secured to the side edges of the forks by any well-known attaching means.

Figure 2:
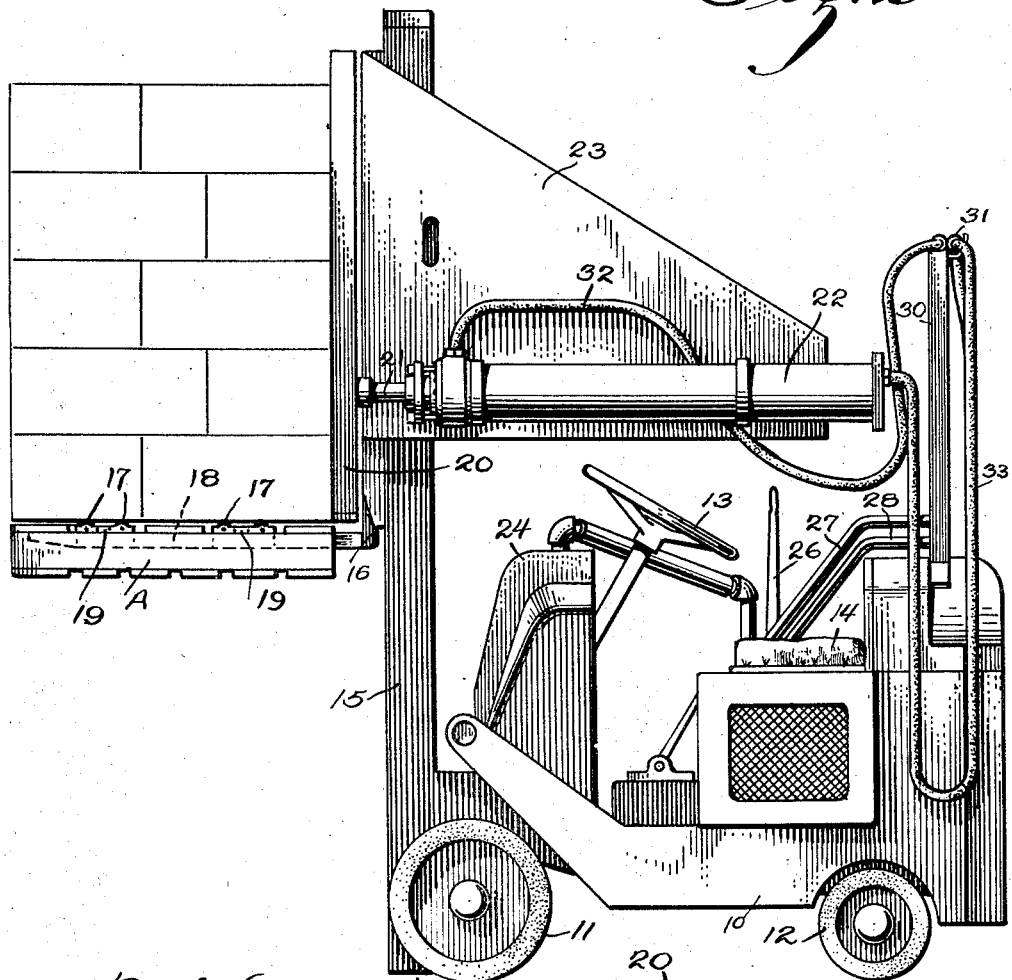
Figure 2 is a side elevational view of the truck showing a loaded pallet on its forks, and in raised position.
Figures 3, 4:
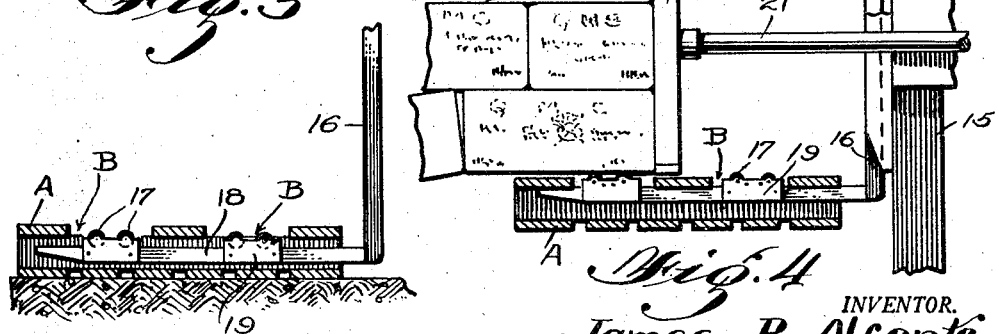
Figure 3 is a detail view, partly in section, showing the forks inserted between the upper and lower surfaces of a pallet, but not yet raised to project the anti-friction rollers through the openings in the load-bearing surface.
Figure 4 is a view similar to Figure 3, but showing the forks as having been raised to lift the goods off of the pallet surface, and the pusher partly operated to move the goods beyond the pallet.

Two pairs of rollers 17 are shown as mounted on each fork member 18, and these pairs are shown as spaced longitudinally of the forks in accordance with the spacing of the two openings B provided in the load-bearing surface of a conventional pallet A (Figs. 2, 3 and 4). The arrangement of the rollers in pairs is desirable, but not essential, as it will be readily apparent that other arrangements could be employed, it being necessary only that the rollers or other anti-friction means be so spaced along the forks that they will register with openings in the upper surface of the pallet when the forks are inserted into the pallet for lifting purposes. It is also essential that the upper surfaces of the rollers 17, or other anti-friction means, be so spaced above the surface of the lifting fork that they will extend above the upper surface of the pallet when the latter is being raised, as indicated in Figures 2 and 4. It is by reason of this arrangement and proportioning of the parts that the goods are automatically raised above the surface of the pallet, also as shown in Figures 2 and 4.

Immediately after the goods have been lifted off of the pallet, if they are to be deposited on the floor of the car, the next step in the unloading process consists in the application of a pusher or stop member to the rear side of the stack of goods so as to move it horizontally relative to the anti-friction rollers 17 and deposit it upon the floor of the car other vehicle being loaded. To this end the fork-lift truck of the present invention is provided with a vertically disposed pusher member 20 mounted upon the outer ends of piston rods 21 of hydraulic cylinders 22. These cylinders are fixed in horizontal position on opposite sides of a rearward extension 23 of the carriage 16, and the cylinders are of course raised and lowered with the carriage as the latter is operated to perform its usual functions.

Figure 5:
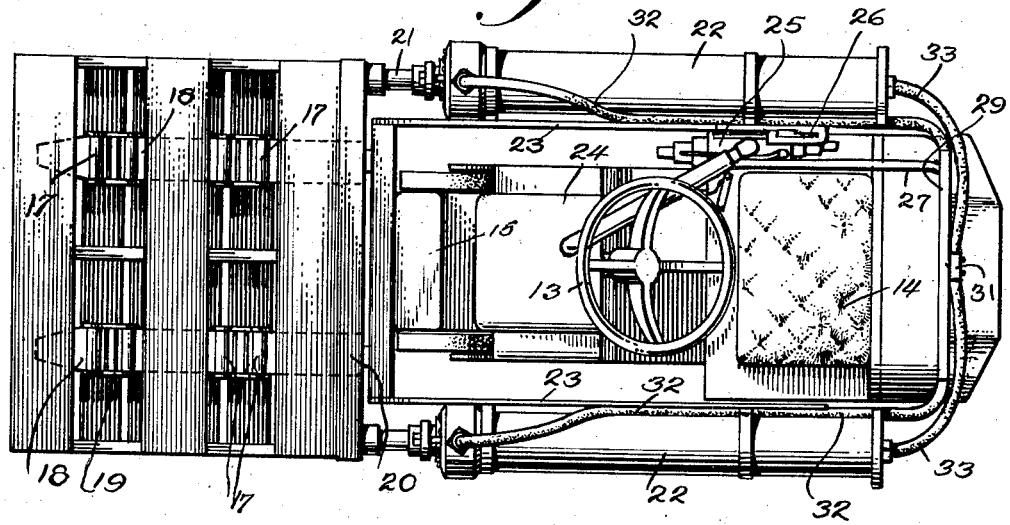
Figure 5 is a plan view of the lift truck.
Figure 6:
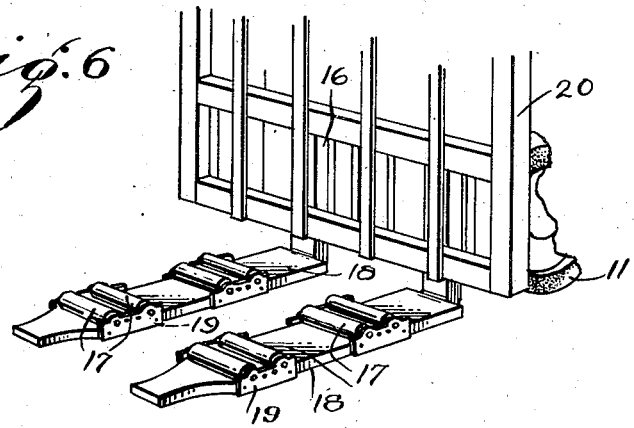
Figure 6 is a detail perspective view of the lift forks and the lower portion of the pusher element.

Carriages of industrial trucks of the type to which the present invention relates are usually raised and lowered hydraulically, and the tank containing the hydraulic fluid is indicated in the present instance by the numeral 24. The operating fluid in this tank may also be used in operating the pusher cylinders 22, and for this purpose a distributing valve 25 (Figure 5) is employed. This valve is controlled by an operating lever 26 to permit the passage of pressure fluid to pipe 27 or 28, one of which communicates with a pipe 29 mounted on a frame 30, and the other of which communicates with a coupling 31 mounted on the same frame. Flexible conduits 32 extend from the ends of pipe 29 to the forward ends of cylinders 22, and similar conduits 33 lead from the coupling 31 to the rear ends of these cylinders. Thus the pusher 20 may be caused to traverse a pallet supported on the forks 18 by the mere shifting of the lever 26.

The fork-lift truck of the present invention retains many of the advantageous features of the conventional lift truck, but possesses an additional operational advantage in the loading of goods in freight cars and other vehicles. In this operation the goods are mechanically picked up and transported to the point of discharge. If the goods are to be deposited on the floor of the vehicle the forks are then lowered as far as possible, and the truck is backed away as power is applied to the pusher cylinders 22. The speed of the movement of these two elements may be nicely adjusted to correspond so that the pusher remains stationary relative to the floor, thereby depositing the stack of goods on the identical spot over which it was supported. Or, if desired under certain conditions, the truck may remain stationary while the pusher 20 moves forward to slide the goods over the anti-friction rollers onto the floor. Also, as hereinbefore indicated, the stack may be deposited on top of a previously discharged stack in the usual manner. In each of these operations, of course, the empty pallet is retained on the forks by reason of its interlocking engagement with the anti-friction means thereon, and will be manually removed to permit the initiation of the next operation of the truck.

It will be understood of course that by removing the detachable anti-friction means on the lift-forks 18 the truck may be operated in the manner of conventional lift trucks, in which event the pusher member 20 would remain inoperative.

In accordance with the patent statutes I have described what I now believe to be the preferred form of the invention, but inasmuch as various changes may be made in the details of construction without departing from the spirit of the invention it is intended that all such changes be included within the scope of the appended claims.

What is claimed is:

1. A fork-lift truck for handling palletized goods, including a fork, anti-friction means on the fork adapted to be passed up through an opening in the load-bearing surface of a conventional pallet so as to space the goods above the pallet, means for raising and lowering the fork, and means for pushing the goods from the anti-friction means to a point beyond the pallet.

2. A fork-lift truck for handling palletized goods, including a fork, anti-friction rollers on the fork adapted to be raised above the load-bearing surface of a pallet so as to raise the goods to a plane spaced slightly above the pallet, means for raising and lowering the fork, and means for pushing the goods from the anti-friction rollers to a point beyond the pallet.

3. A fork-lift truck for handling palletized goods, including a fork, anti-friction means on the fork adapted to be passed through an opening in the load-bearing surface of a conventional pallet so as to space the goods above the pallet, and means for raising and lowering the fork.

JAMES R. ALFONTE.